(12) United States Patent
Taylor et al.

(10) Patent No.: US 8,119,211 B1
(45) Date of Patent: Feb. 21, 2012

(54) BAG-ON-VALVE ASSEMBLY

(75) Inventors: Nathan Edward Taylor, Appleton, WI (US); John Kenneth Nettekoven, Oshkosh, WI (US)

(73) Assignee: Curwood, Inc., Oshkosh, WI (US)

( * ) Notice: Subject to any disclaimer, the term of this patent is extended or adjusted under 35 U.S.C. 154(b) by 517 days.

(21) Appl. No.: 12/361,465

(22) Filed: Jan. 28, 2009

(51) Int. Cl.
*B32B 1/02* (2006.01)
*B32B 1/08* (2006.01)

(52) U.S. Cl. ............ 428/35.2; 428/34.1; 428/34.2; 428/35.7; 428/35.9; 428/36.9

(58) Field of Classification Search ........... 428/34.1, 428/34.2, 35.2, 35.7, 35.9, 36.9
See application file for complete search history.

(56) References Cited

U.S. PATENT DOCUMENTS

| | | |
|---|---|---|
| 4,346,743 A | 8/1982 | Miller |
| 5,219,005 A | 6/1993 | Stoffel |
| 5,514,431 A * | 5/1996 | Shimomura ............ 428/35.3 |
| 5,587,230 A * | 12/1996 | Lin et al. ............... 442/135 |
| 5,916,655 A * | 6/1999 | Kwon .................... 428/64.1 |
| 6,439,430 B1 | 8/2002 | Gilroy, Sr. et al. |
| 6,874,659 B2 | 4/2005 | Schiestl et al. |
| 2004/0000501 A1* | 1/2004 | Shah et al. ............ 206/524.8 |
| 2004/0265515 A1* | 12/2004 | Lingier et al. ......... 428/32.34 |
| 2006/0186655 A1* | 8/2006 | Ehrke .................... 280/743.1 |
| 2008/0314475 A1 | 12/2008 | Fransen |

OTHER PUBLICATIONS

"Standard Test Method for Tensile Properties of Thin Plastic Sheets," ASTM International, West Conshohocken, PA, 2010, DOI: 10.1520/D0882-10, www.astm.org.

* cited by examiner

*Primary Examiner* — Marc Patterson
(74) *Attorney, Agent, or Firm* — Tom J. Hall

(57) ABSTRACT

The present invention is directed to a bag-on-valve assembly comprising a valve stem and a flexible bag which is affixed to the valve stem and encapsulates a portion of said valve stem therein. The bag comprises a sealable thermoplastic film which is free of foil and is adapted to have an Tensile Energy to Break value of at least 150 in*ft-lbs in both the machine direction and transverse directions.

35 Claims, 2 Drawing Sheets

BAG-ON-VALVE ASSEMBLY

FIELD OF THE INVENTION

The present invention relates generally to a bag-on-valve assembly, and more particularly to a bag-on-valve assembly including a flexible bag with improved film properties.

BACKGROUND OF THE INVENTION

Bag-on-valve systems are described in the prior art. For example, U.S. Pat. No. 3,823,849, assigned to Coster Technologie Speciali SPA, describes a system in which a flexible bag is sealed to the valve and valve housing of an aerosol valve. Likewise, U.S. Pat. No. 7,124,788, assigned to Precision Valve Corporation, describes a similar bag-on-valve arrangement, where the valve has two filling position. One is used to fill the bag with a product and the other position directs propellant into the aerosol container outside the bag.

In a bag-on-valve system, the product to be dispensed is filled into the inside of the bag and a liquefied or compressed gas propellant is filled into the aerosol container outside the bag. When the aerosol valve is actuated, the pressure in the propellant chamber (between the bag and the outer casing of the aerosol container) forces compression of the bag, which drives the product contained in the bag through the aerosol valve.

Disadvantages of bag-on-valve systems include fragility of both the bag and bag/valve combination, and the cost of raw materials used to fabricate the bag. Conventional bags in bag-on-valve systems include a layer of metallic foil which strengthens the bag and provides a barrier to the ingress of gas. However, metal foil is expensive and tends to be brittle. Under pressure, accidental dropping or mishandling of the filled aerosol container can rupture the foil and/or damage the bag/valve combination. Damage to the bag/valve combination may result in separation of the bag to the valve stem.

This invention aims to remedy one or several of the above-mentioned disadvantages and to provide a bag/valve assembly with improved toughness while still maintaining excellent sealing and barrier properties.

SUMMARY OF THE INVENTION

In a first aspect, a bag-on-valve assembly comprises a valve stem and a flexible bag which is affixed to the valve stem and encapsulates a portion of said valve stem therein; the bag comprises a sealable thermoplastic film which is adapted to have an Tensile Energy to Break value of at least 150 in*ft-lbs in both the machine direction and transverse directions. It has been discovered that the desired property of the thermoplastic film of this invention is achieved by producing a multilayer film which is free of metallic foil, preferably, a coextruded multilayer film which is free of metallic foil. In particular, a preferred embodiment of the present invention includes a thermoplastic film comprising at least one heat-sealable layer and at least one layer of nylon.

In a second aspect, a bag-on-valve assembly comprises a valve stem and a flexible bag which is affixed to the valve stem and encapsulates a portion of said valve stem therein; the bag comprises a heat-sealable thermoplastic film which is adapted to have an Tensile Energy to Break value of at least 150 in*ft-lbs in both the machine direction and transverse directions and provides hermetic seals when heat sealed to the valve stem. It has been discovered that the desired properties of the thermoplastic film of this invention are achieved by producing a multilayer film which is free of metallic foil, preferably, a coextruded multilayer film which is free of metallic foil, and have an overall film thickness greater than 3.0 mils, preferably, greater than 4.0 mils. In particular, another preferred embodiment of the present invention includes a thermoplastic film comprising at least one heat-sealable layer having a thickness of 3.0 mils or less and at least one layer of nylon and an overall film thickness greater than 3.0 mils.

In a third aspect, a bag-on-valve assembly comprises a valve stem and a flexible bag which is affixed to the valve stem and encapsulates a portion of said valve stem therein; the bag comprises a heat-sealable thermoplastic barrier film which is adapted to have an oxygen transmission rate of 10.0 $cm^3/100$ $in^2/24$ hr or less as measured at 23° C. and 80% relative humidity and a Tensile Energy to Break value of at least 150 in*ft-lbs in both the machine direction and transverse directions. It has been discovered that the desired properties of the thermoplastic film of this invention are achieved by producing a multilayer film which is free of metallic foil, preferably, a coextruded multilayer film which is free of metallic foil, and have an overall film thickness greater than 3.0 mils, preferably, greater than 4.0 mils. In particular, another preferred embodiment of the present invention includes a sealable thermoplastic film comprising at least one heat-sealable layer having a thickness of 3.0 mils or less, an overall film thickness greater than 4.0 mils, and at least two layers of nylon in direct contact with a layer of a barrier material, preferably at least two layers of nylon in direct contact with a layer of ethylene/vinyl alcohol copolymer.

DEFINITIONS

"Polymer" herein refers to the product of a polymerization reaction, and is inclusive of homopolymers, copolymers, terpolymers, tetrapolymers, etc.

"Copolymer" herein refers to a polymer formed by the polymerization reaction of at least two different monomers and is inclusive of random copolymers, block copolymers, graft copolymers, etc.

"Thermoplastic" herein refers to a polymeric material that softens when exposed to heat and which substantially returns to a non-softened condition when cooled to room temperature.

"Film" herein refers to plastic web materials having a thickness of 0.50 mm (20 mils) or less such as 0.25 mm (10 mils) or less.

"Foil" herein refers to any metallic foil or metallized substrate having a thickness of between 10,000 Angstroms and 12 mils.

"Barrier material" refers to an oxygen and/or water vapor barrier materials. Barrier materials may include, for example, polyvinyl alcohol copolymers, ethylene vinyl alcohol copolymers, polyvinyl chlorides, polyvinylidene chloride homopolymers and copolymers, polyvinylidene chloride/methyl acrylate copolymers, and metallized substrates or metallic coatings which may include such metals such as aluminum, zinc, nickel, copper, bronze, gold, silver, tin, or alloys thereof, metal oxides, organometallic compounds, ceramics and mixtures thereof. The term "metallic coating" refers to the coating on any polymeric substrate having at least one surface coated with a metal, metallic oxide, ceramic or mixtures thereof. Metal suitable for use as a coating may include aluminum, zinc, nickel, copper, bronze, gold, silver, and alloys made thereof. The coating process or metallization may be accomplished by conventional techniques known to those skilled in the art, such as electroplating, sputtering, or vacuum vapor-deposition. Metallization preferably is done by vacuum vapor-deposition where a polymeric substrate is passed over a source of metal vapor with the surface of the substrate facing the source of metal vapor. The metal vapor condenses on the substrate and produces a thin coating of metal having a thickness of from about 10-10,000 angstroms "Oxygen barrier" refers to any material which will control the oxygen permeability of the entire film. For some applications, the oxygen transmission rate (OTR) desirably should be minimized. The term "oxygen transmission rate" is defined herein as the amount of oxygen in cubic centimeters ($cm^3$) which will pass through a 100 in.$^2$ of film in 24 hr. at 80% R.H. and 23° C. The thickness (gauge) of the film has a direct relationship on the oxygen transmission rate. Films which are useful as an oxygen barrier are required to have an OTR value of from about 0-10.0 $cm^3$/100 in.$^2$ over 24 hr. at 80% R.H. and 23° C. at 1.0 mils or less.

"Water vapor transmission rate or (WVTR)" refers to the amount of water vapor (grams) which will pass through 100 in.$^2$ of film in 24 hours at 90% R.H. and 38° C. or g/100 in.$^2$ over 24 hr. at 90% R.H. and 38° C. The water vapor transmission rate is thickness dependent. Typical films suitable as a water vapor barrier have an WVTR value of from 0-10.0 g/100 in.$^2$ over 24 hr. at 90% R.H. and 38° C. at a thickness of 1.0 mils or less.

"Slow Rate Penetration Resistance" herein refers to the test which permits flexible thermoplastic webs to be characterized for slow rate penetration resistance to a driven probe. The test is performed at room temperature, by applying a biaxial stress at a single test velocity on the material until perforation occurs. The force, energy, and elongation to perforation are determined and reported in units of Newtons. A person having ordinary skill in the art would recognize that Slow Rate Penetration Resistance is a measure of a film's toughness and puncture resistance. A film with a high Slow Rate Penetration Resistance value, relative to an incumbent film, is tougher and more puncture resistant and thus, would be desirable to the industry.

"Tensile Energy to Break" herein refers to the area under the stress-strain curve to the break point as defined in ASTM D 882-83 and may be calculated by integrating the area under the stress-strain curve. A film with a high Tensile Energy to Break value, relative to an incumbent film, is also tougher and more puncture resistant and thus, would be desirable to the industry.

"Heat Seal" refers to the union of a surface (or portion thereof) of one substrate to a surface (or portion thereof) of another substrate using heat and pressure. The heat-seal is achieved by bringing two surfaces or portions of a surface into contact, or at least close proximity, with one another and then applying sufficient heat and pressure to a predetermined area of the two surfaces to cause the contacting surfaces to become molten and intermix with one another, thereby forming as essentially inseparable fusion bond between the two surfaces in the predetermined area when the heat and pressure are removed therefrom and the area is allowed to cool. Heat sealing of two surfaces may be achieved by means of a heated bar, hot air, infrared radiation, ultrasonic sealing, etc. Typical heat sealing conditions for attaching flexible bags to valve stems for bag-on-valve assemblies are 149° C., 30 pounds per square inch for a 2.5 second dwell time. Although, the temperature, pressure and dwell time can vary depending upon the materials used to form a heat sealable layer and valve stem body.

BRIEF DESCRIPTION OF THE DRAWINGS

A detailed description of embodiments of the invention follows, with reference to the attached drawings, wherein.

DETAILED DESCRIPTION OF THE INVENTION

Figure 1:
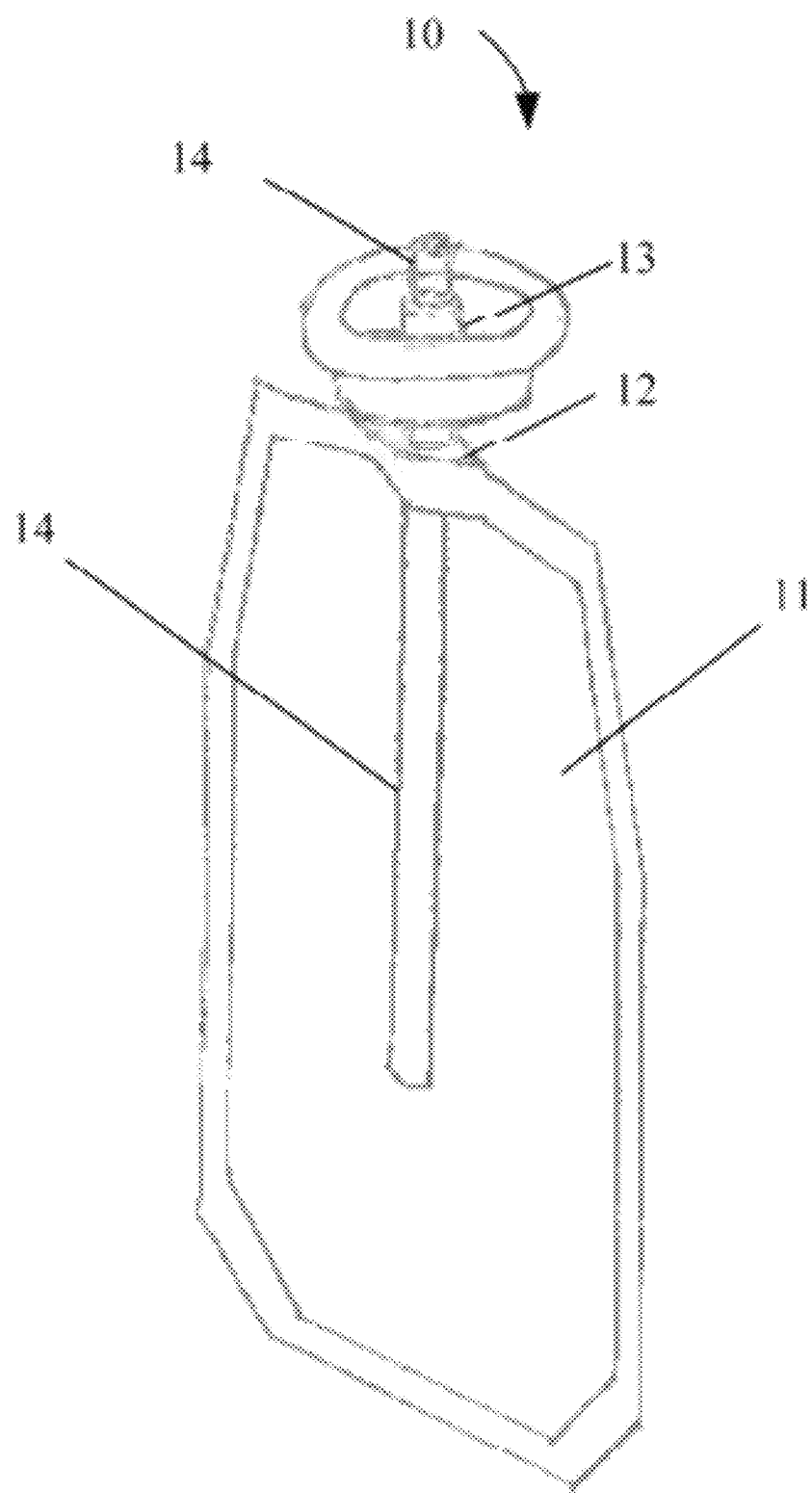
FIG. 1 illustrates a view of one preferred embodiment of a bag-on-valve assembly according to the present invention depicting a bag heat attached to the valve stem.

A preferred embodiment of the bag-on-valve assembly of the present invention is depicted in FIG. 1. The improved bag-on-valve assembly 10 includes a flexible bag 11 made of a thermoplastic multilayer film (see FIG. 2) which is affixed to valve stem 14. According to a preferred embodiment of the present invention, valve stem 14 may be attached to bag 11 by any conventional method known in the art which may include, but is not limited to, heat sealing, crimping and the use of an appropriate adhesive. Preferably, valve stem 14 is heat sealed to bag 11. As depicted, bag 11 is heat sealed directly to a valve stem at valve stem body 12 positioned below valve 13.

Figure 2:
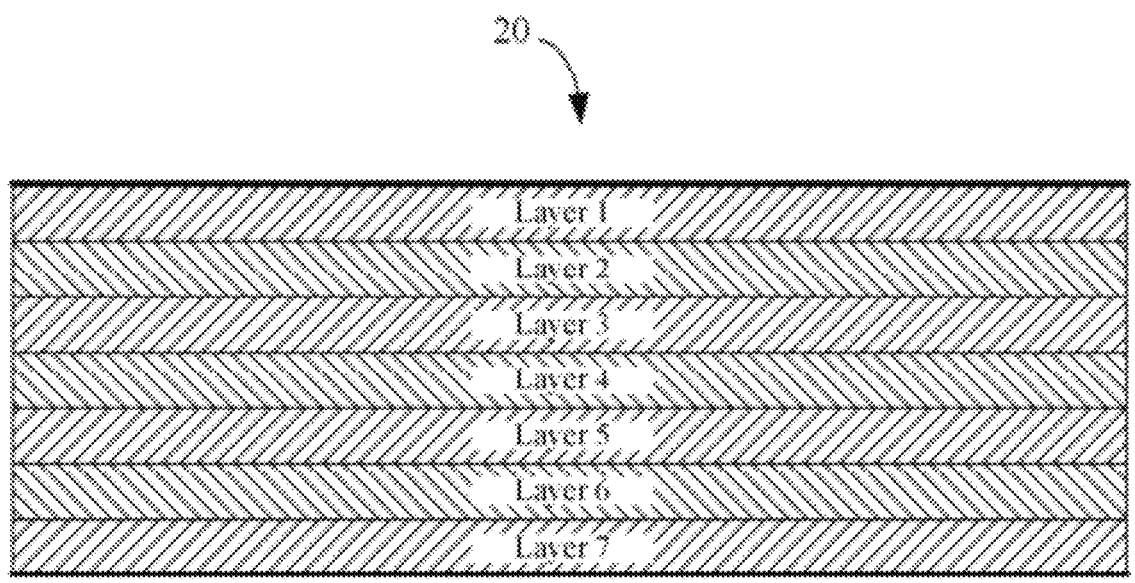
FIG. 2 illustrates a fragmentary cross-sectional view of a preferred embodiment of a multilayer thermoplastic barrier film suitable for use as a flexible bag according to the present invention.

In FIG. 2 there is illustrated a preferred embodiment of a thermoplastic film structure for use as a flexible bag according to the present invention. As depicted, multilayer film structure 20 comprises seven layers (in sequential order of 1 through 7), respectively. It will be noted layer 1 is a heat sealable layer. It will be understood the multilayer thermoplastic film suitable for use in the present invention is not limited to a seven layer film structure as illustrated by film 20 and may have as many film layers as desired. Examples of preferred embodiments of film structure 20 which are non-foil-containing structures for use in the present invention are presented below as Examples #1 and #2 in Table 1. Examples of comparative non-foil-containing film structure, Examples #3 and #4, and an example of a comparative foil-containing film structure, Example #5 are also presented below in Table 1.

TABLE 1

Multilayer Film Compositions and Structures

| Layer | Example #1 Inventive Film | Example #2 Inventive Film | Example #3 Comparative Film | Example #4 Comparative Film | Example #5 Comparative Film |
|---|---|---|---|---|---|
| #1 | 71.20% (wt.) mLLDPE + 25.00% (wt.) VLDPE + 3.80% (wt.) Additives* | 71.20% (wt.) HDPE + 25.00% (wt.) mLLDPE + 3.80% (wt.) Additives | 71.20% (wt.) HDPE + 25.00% (wt.) mLLDPE + 3.80% (wt.) Additives | 71.20% (wt.) mLLDPE + 25.00% (wt.) HDPE + 3.80% (wt.) Additives | 100.00% (wt.) LLDPE |
| #2 | 90.00% (wt.) VLDPE + | 80.00% (wt.) HDPE + | 60.00% (wt.) HDPE + | 90.00% (wt.) VLDPE + | 100.00% (wt.) |

TABLE 1-continued

Multilayer Film Compositions and Structures

| Layer | Example #1 Inventive Film | Example #2 Inventive Film | Example #3 Comparative Film | Example #4 Comparative Film | Example #5 Comparative Film |
|---|---|---|---|---|---|
| | 10.00% (wt.) mod-PE | 10.00% (wt.) LLDPE + 10.00% (wt.) mod-PE | 30.00% (wt.) LLDPE + 10.00% (wt.) mod-PE | 10.00% (wt.) mod-PE | LDPE |
| #3 | 100.00% (wt.) Nylon-1 | 100.00% (wt.) Nylon-1 | 100.00% (wt.) Nylon-1 | 100.00% (wt.) Nylon-1 | 100.00% (wt.) EAA |
| #4 | 100.00% (wt.) EVOH | 100.00% (wt.) EVOH | 100.00% (wt.) EVOH | 100.00% (wt.) EVOH | 100.00% (wt.) Foil |
| #5 | 100.00% (wt.) Nylon-1 | 100.00% (wt.) Nylon-1 | 100.00% (wt.) Nylon-1 | 100.00% (wt.) Nylon-1 | 100.00% (wt.) EAA |
| #6 | 90.00% (wt.) VLDPE + 10.00% (wt.) mod-PE | 80.00% (wt.) HDPE + 10.00% (wt.) LLDPE + 10.00% (wt.) mod-PE | 60.00% (wt.) HDPE + 30.00% (wt.) LLDPE + 10.00% (wt.) mod-PE | 100.00% (wt.) mod-PE | 100.00% (wt.) LDPE |
| #7 | 73.00% (wt.) Nylon-2 + 14.00% (wt.) Nylon-1 + 13.00% (wt.) Additives | 73.00% (wt.) Nylon-2 + 14.00% (wt.) Nylon-1 + 13.00% (wt.) Additives | 73.00% (wt.) Nylon-2 + 14.00% (wt.) Nylon-1 + 13.00% (wt.) Additives | 73.00% (wt.) Nylon-2 + 14.00% (wt.) Nylon-1 + 13.00% (wt.) Additives | 100.00% (wt.) OPET |

*All additives may include slip, antiblock agents and processing aids.

"LDPE" is a low density polyethylene resin having a melt index of 3.70 g/10 min. and density of 0.923 g/cm$^3$. An example of suitable commercially available low density polyethylene resin includes Equistar Petrothene® NA216000 from Equistar Chemicals, LLP, Houston, Tex., U.S.A.

"LLDPE" is a linear low density polyethylene resin having a melt index of 0.9-1.0 g/10 min., density of 0.92 g/cm$^3$. Examples of suitable commercially available linear low density polyethylene resins include Dow™ 2645G, 2045G and Dow™ Elite 5100G from the Dow Chemical Company, Midland, Mich., U.S.A, and Sclair® FP120 A from the Nova Chemicals, Inc. Calgary, Alberta, Canada.

"VLDPE" is a very low density polyethylene resin having a melt index of 0.5-1.0 g/10 min., density of 0.910-0.912 g/cm$^3$. An example of a suitable commercially available very low density polyethylene resin includes Dow™ 4201G from the Dow Chemical Company, Midland, Mich., U.S.A.

"HDPE" is a high density polyethylene resin having melt index of 0.850 g/10 min. and a melting point of between 199-210° C., and a density of 0.958 g/cm$^3$. An example of a suitable commercially available high density polyethylene includes Equistar Alathon® from Equistar Chemicals, LLP, Houston, Tex., U.S.A.

"mLLDPE" is a metallocene-catalysis ethylene/hexene copolymer resin having a melt index of 7.5 g/10 min and density of 0.900 g/cm$^3$. An example of a suitable commercially available mLLDPE includes Exact® 3139 from ExxonMobil Chemical Company, Houston, Tex., U.S.A.

"mod-PE" is an anhydride-modified polyethylene copolymer resin having a melt index of 2.7-4.0 g/10 min. and density of 0.910-0.939 g/cm$^3$. An example of a suitable commercially available anhydride-modified polyethylene copolymer resin includes Equistar™ PX 3308 from Equistar Chemicals, LLP, Houston, Tex., U.S.A.

"Nylon-1" is a nylon 6 resin having a melt point of 263° C. and density of 1.13 g/cm$^3$. An example of a suitable commercially available ionomer resin includes DuPont™ Surlyn® 1705-1 from E. I. du Pont de Nemours and Company, Wellington, Del., U.S.A.

"Nylon-2" is a nylon 66 resin having a melt point of 220° C. An example of a suitable Commercially available nylon 66 includes DuPont™ Zytel® 42A from E. I. du Pont de Nemours and Company, Wellington, Del., U.S.A.

"EVOH" is an ethylene/vinyl alcohol copolymer resin having an ethylene content of 29% (mol.), a melt index of 3.8 g/10 min. and melting point of 188° C. An example of a suitable commercially available ethylene/vinyl alcohol copolymer resin having an ethylene content of 29% (mol.) includes Soarnol® DT2904R from Soarus, LLP, Arlington Heights, Ill., U.S.A.

"EAA" is an ethylene/acrylic acid copolymer resin having comonomer content of between 3.0 and 9.7%, a density of between of 0.926-0.940 g/cm$^3$, a melt index of 11.00 min., and a melting point of between 98.0-104° C. Examples of suitable commercially available ethylene/acrylic acid copolymer resins include those materials sold under the family trademark Dow™ Primacor™ from the Dow Chemical Company, Midland, Mich., U.S.A.

"Foil" is an aluminum foil having a thickness of between 27.7-28.5 gauge (0.275-0.285 mils).

"OPET" is a biaxially oriented polyethylene terephthalate film having a thickness of 48 gauge (0.48 mils) which is supplied by Mitsubishi Polyester Film GmbH, Wiesbaden, Germany.

To produce the film structures of Examples #1 through #4, a simple coextrusion blown film process may be used, examples of which are described, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Generally, the simple blown film process may include an apparatus having a multi-manifold circular die head through which the film layers are forced and formed into a cylindrical multilayer film bubble. The bubble may be quenched, e.g., via cooled water bath, solid surface and/or air, and then ultimately collapsed and formed into a multilayer film. It is appreciated by a person of ordinary skill in the art that cast extrusion techniques may also be used to fabricate the non-heat shrinkable thermoplastic substrates for use in the present invention.

Unless otherwise noted, the polymer resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the polymer layers, by blending prior to extrusion. The resins and any additives may be introduced to an extruder where the resins are melt-plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

To produce the film structure of Example #5, any lamination process may be used, for example, extrusion lamination, adhesion lamination, or the like may be used.

All the film Examples #1 through 5 in Table 1 exhibited an OTR value of from about 0-10.0 cm$^3$/100 in.$^2$ over 24 hr. at 80% R.H. and 23° C., and WVTR value of from 0-10.0 g./100 in.$^2$ over 24 hr. at 90% R.H. and 38° C.

As Table 2 indicates, the values for Tensile Elongation in both the machine and transverse directions for non-foil containing film structures, i.e., Examples #1 through 4 were higher and thus improved over a foil-containing film structure, Example #5. This test simulates the action encountered in applications where moderate-velocity blunt impacts occur in relatively small areas of bag/stem assembly. The values for Tensile Energy to Break in both the machine and transverse directions for non-foil containing film structures, Examples #1 and #2 were higher and thus improved over the non-foil containing film structures, Examples #2 and #3, and foil-containing film structure, Example #5. Higher Tensile Elongation and Tensile Energy to Break are both desirable characteristics in a film for use in a bag-on-valve assembly.

TABLE 2

Average Film Properties

| | Examples | | | | |
|---|---|---|---|---|---|
| | #1 Inventive Film | #2 Inventive Film | #3 Comparative Film | #4 Comparative Film | #5 Comparative Film |
| Slow Rate Penetration Resistance (Sealant Surface) in Newtons | 25.70 | 25.57 | 19.93 | 22.07 | 27.83 |
| Tensile Elongation (MD) in % | 492 | 527 | 521 | 419 | 95 |
| Tensile Elongation (MD) in % | 548 | 448 | 370 | 419 | 86 |
| Tensile Peak Stress (MD) in psi | 5339 | 5106 | 5603 | 4595 | 4946 |
| Tensile Peak Stress (TD) in psi | 5708 | 5032 | 4558 | 4311 | 5169 |
| Tensile Peak Load (MD) in lb-force | 26.34 | 27.10 | 24.06 | 21.66 | 23.20 |
| Tensile Peak Load (TD) in lb-force | 30.82 | 25.88 | 18.44 | 20.07 | 24.64 |
| Tensile Modulus (MD) in psi | 103938 | 146377 | 326558 | 119373 | 214817 |
| Tensile Modulus (TD) in psi | 113793 | 155968 | 145738 | 122565 | 174000 |
| Tensile Energy to Break (MD) in*foot-lbs | 178.13 | 207.36 | 172.56 | 166.40 | 38.72 |
| Tensile Energy to Break (TD) in*foot-lbs | 242.83 | 172.08 | 101.79 | 129.45 | 35.66 |
| Overall film thickness in mils | 4.77 | 5.31 | 4.29 | 4.73 | 4.77 |

Unless otherwise noted, the physical properties and performance characteristics reported herein were measured by test procedures similar to the following ASTM methods. The ASTM test procedures are hereby incorporated herein by reference in their entireties.

| | |
|---|---|
| Density | D-1505 |
| Melt Index | D-1238 |
| Melting Point | D-3417 |
| Oxygen Transmission Rate | D-3985 |
| Slow Rate Penetration Resistance | F-1306 |
| Tensile Elongation | D-882-83 |
| Tensile Energy to Break | D 882-83 |
| Tensile Modulus | D-882-83 |
| Water Vapor Transmission Rate | F-1249 |

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:

1. A bag-on-valve assembly for containing a product to be dispensed from a aerosol container comprising:
   a) a valve stem;
   b) a flexible bag affixed to said valve stem and encapsulating a portion of said valve stem therein; wherein said bag comprises a sealable thermoplastic film which is free of metallic foil;
   c) wherein said film is adapted to have a tensile energy to break value of at least 150 inch-pounds-force per cubic inch in both the machine direction and transverse directions as measured in accordance with ASTM D 882-83; and
   d) wherein when said bag-on-valve assembly is actuated said product is dispensed from said bag through said valve stem.

2. The bag-on-valve assembly according to claim 1, wherein said film has a Slow Rate Penetration Resistance value greater than 21 Newtons.

3. The bag-on-valve assembly according to claim 1, wherein said film has a Slow Rate Penetration Resistance value greater than 24 Newtons.

4. The bag-on-valve assembly according to claim 1, wherein said film has a Tensile Peak Load value of at least 22 pound-force.

5. The bag-on-valve assembly according to claim 1, wherein said film has a Tensile Peak Load value of at least 25 pound-force.

6. The bag-on-valve assembly according to claim 1, wherein said film has a Tensile Modulus value of at least 70,000 pounds/square inch in both the machine and transverse directions.

7. The bag-on-valve assembly according to claim 1, wherein said film has an overall thickness of greater than 3.0 mils.

8. The bag-on-valve assembly according to claim 1, wherein said film has an overall thickness of greater than 4.0 mils.

9. The bag-on-valve assembly according to claim 1, wherein said film further comprises a heat-sealable layer having a thickness of 3.0 mils or less whereby said bag is heat sealed to said valve stem.

10. The bag-on-valve assembly according to claim 1, wherein said film comprises at least one layer of nylon.

11. The bag-on-valve assembly according to claim 10, wherein said nylon is a nylon blend.

12. The bag-on-valve assembly according to claim 1, wherein said film comprises at least two layers of nylon.

13. The bag-on-valve assembly according to claim 1, wherein said film comprises at least three layers of nylon.

14. The bag-on-valve assembly according to claim 1, wherein said film comprises at least two layers of nylon in direct contact with a layer of barrier material.

15. The bag-on-valve assembly according to claim 14, wherein said film has an oxygen transmission rate of 10 cm/100 inch$^2$/24 hr or less as measured at 23° C. and 80% relative humidity.

16. A bag-on-valve assembly for containing a product to be dispensed from an aerosol container comprising:
   a) a valve stem;
   b) a flexible bag heat-sealed to said valve stem and encapsulating a portion of said valve stem therein; wherein said bag comprises a multilayer heat-sealable thermoplastic film which is free of metallic foil and has an overall film thickness greater than 3.0 mils; wherein said film comprises a heat-sealable layer having a thickness of 3.0 mils or less and at least one layer of nylon;
   c) wherein said film is adapted to have an Tensile Energy to Break value of at least 150 inch-pounds-force per cubic inch in both the machine direction and transverse directions as measured in accordance with ASTM D 882-83;
   d) wherein when said bag-on-valve assembly is actuated said product is dispensed from said bag through said valve stem.

17. The bag-on-valve assembly according to claim 16, wherein said film has an overall film thickness greater than 4.0 mils.

18. The bag-on-valve assembly according to claim 16, wherein said film has a Slow Rate Penetration Resistance value greater than 21 Newtons.

19. The bag-on-valve assembly according to claim 16, wherein said film has a Slow Rate Penetration Resistance value greater than 22 Newtons.

20. The bag-on-valve assembly according to claim 16, wherein said film has a Tensile Peak Load value of at least 22 pound-force.

21. The bag-on-valve assembly according to claim 16, wherein said film has a Tensile Peak Load value of at least 25 pound-force.

22. The bag-on-valve assembly according to claim 16, wherein said film has a Tensile Modulus value of at least 100,000 pounds/square inch in both the machine and transverse directions.

23. The bag-on-valve assembly according to claim 11, wherein said film further comprises at least two layers of nylon.

24. The bag-on-valve assembly according to claim 16, wherein said film comprises at least three layers of nylon.

25. The bag-on-valve assembly according to claim 16, wherein at one of said layers of nylon is a nylon blend.

26. The bag-on-valve assembly according to claim 16, wherein said film further comprises at least two layers of nylon in direct contact with a layer of barrier material.

27. The bag-on-valve assembly according to claim 26, wherein said film has an oxygen transmission rate of 10.0 cm$^3$/100 inch$^2$/24 hr or less as measured at 23° C. and 80% relative humidity.

28. A bag-on-valve assembly for containing a product to be dispensed from an aerosol container comprising:
   a) a valve stem;
   b) a flexible bag heat-sealed to said valve stem and encapsulating a portion of said valve stem therein; wherein said bag comprises a multilayer thermoplastic oxygen barrier film which is free of metallic foil and has an overall film thickness greater than 4.0 mils; wherein said film comprises a heat-sealable layer having a thickness of 3.0 mils or less and at least two layers of nylon in direct contact with a layer of ethylene/vinyl alcohol copolymer;
   c) wherein said film is adapted to have an oxygen transmission rate of 10.0 cm$^3$/100 in$^2$/24 hr or less as measured at 23° C. and 80% relative humidity and Tensile Energy to Break value of at least 150 inch-pounds-force per cubic inch in both the machine direction and transverse directions as measured in accordance with ASTM D 882-83;

d) wherein when said bag-on-valve assembly is actuated said product is dispensed from said bag through said valve stem.

29. The bag-on-valve assembly according to claim 28, wherein said film has a Slow Rate Penetration Resistance value greater than 24 Newtons.

30. The bag-on-valve assembly according to claim 28, wherein said film has a Tensile Peak Load value of at least 25 pound-force.

31. The bag-on-valve assembly according to claim 28, wherein said film has a Tensile Modulus value of at least 100,000 pounds/square inch in both the machine and transverse directions.

32. The bag-on-valve assembly according to claim 28, wherein said film further comprises at least three layers of nylon.

33. The bag-on-valve assembly according to claim 28, wherein said film has a Slow Rate Penetration Resistance value greater than 24 Newtons.

34. The bag-on-valve assembly according to claim 28, wherein said film has a Tensile Peak Load value of at least 25 pound-force.

35. The bag-on-valve assembly according to claim 28, wherein at least one of said nylon layers is a nylon blend.

\* \* \* \* \*